United States Patent
Schilling et al.

[11] Patent Number: 6,162,748
[45] Date of Patent: Dec. 19, 2000

[54] WOVEN FLOOR COVERINGS

[75] Inventors: Lee Hilton Schilling, Lookout Mountain; Paul D. Evans, Jr., Dalton, both of Ga.

[73] Assignee: Collins & Aikman Floorcoverings, Inc., Dalton, Ga.

[21] Appl. No.: 09/221,426

[22] Filed: Dec. 28, 1998

Related U.S. Application Data

[63] Continuation-in-part of application No. 08/388,986, Feb. 15, 1995.

[51] Int. Cl.$^7$ .............................. B32B 3/02; B32B 33/00
[52] U.S. Cl. ..................... 442/226; 442/221; 428/96; 428/85; 428/317.3; 156/72
[58] Field of Search .................................. 442/226, 221, 442/164, 168; 428/96, 85, 317.3, 41.8, 354; 156/72

[56] References Cited

U.S. PATENT DOCUMENTS

| | | | |
|---|---|---|---|
| 2,707,160 | 4/1955 | Van Issum | 154/49 |
| 3,014,829 | 12/1961 | Curtin | 154/49 |
| 3,334,153 | 8/1967 | Fukushima et al. | 260/857 |
| 3,551,231 | 12/1970 | Smedberg | 156/72 |
| 3,560,294 | 2/1971 | Wisotzky et al. | 156/72 |
| 3,654,219 | 4/1972 | Boyer et al. | 260/41.5 |
| 3,658,752 | 4/1972 | Das et al. | 260/41.5 A |
| 3,661,691 | 5/1972 | Solsberg | 161/67 |
| 3,695,987 | 10/1972 | Wisotzky et al. | 161/67 |
| 3,698,973 | 10/1972 | Wisotzky et al. | 156/78 |
| 3,728,182 | 4/1973 | Wisotzky et al. | 156/72 |
| 4,003,866 | 1/1977 | Paturle | 260/17.4 R |
| 4,028,159 | 6/1977 | Norris | 156/94 |
| 4,105,709 | 8/1978 | Iwami et al. | 260/857 L |
| 4,158,646 | 6/1979 | Benkowski et al. | 260/2.3 |
| 4,234,649 | 11/1980 | Ward | 428/255 |
| 4,242,389 | 12/1980 | Howell | 428/40 |
| 4,250,222 | 2/1981 | Mavel et al. | 428/285 |

(List continued on next page.)

FOREIGN PATENT DOCUMENTS

| | | |
|---|---|---|
| 2080259 | 4/1993 | Canada . |
| 0511469 | 11/1992 | European Pat. Off. . |
| 2425751 | 12/1975 | Germany . |
| 4014012A1 | 10/1991 | Germany . |
| 60-206868 | 10/1985 | Japan . |
| 3239754 | 10/1991 | Japan . |
| 9319654 | 10/1993 | Japan . |
| 1058978 | 12/1983 | Russian Federation . |
| 2049540 | 12/1980 | United Kingdom . |

OTHER PUBLICATIONS

Gheysen et al., *Face–to–facce carpet weaving for creativity and productivity*, pp. 137–138, 1450, 142, and 145.

*Primary Examiner*—Daniel Zirker
*Attorney, Agent, or Firm*—McGuireWoods, LLP

[57] ABSTRACT

The present invention relates to a method of preparing a woven textile surface covering. The method involves applying a resin composition layer onto a back surface of a woven layer. The woven layer is formed by weaving warp and weft yarns. The resin composition layer is effective for bonding to the warp and weft yarns. The resin composition layer is provided with a resin composition and a cross-linking agent effective to wet, penetrate, and encapsulate the warp and weft yarns. The resin composition layer occupies the interstices of the warp and weft yarns and when the resin is heated, the resin cross-links with the woven layer. A backing layer is then contacted with the surface of the heated resin composition layer thereby bonding the backing layer to the resin composition layer. The present invention also relates to a woven textile surface covering having a first layer with a decorative surface and a back surface. The first layer is formed from woven warp and weft yarns that have interstices therebetween. The woven textile surface covering has a second layer that has a yarn engaging surface where at least a portion of the yarn engaging surface occupies the interstices of the warp and weft yarns. The second layer includes a resin composition and a cross-linking agent. The cross-linking agent is effective for cross-linking the resin composition with the warp and weft yarns. The resin composition and the cross-linking agent are effective for wetting, penetrating, and encapsulating at least a portion of the warp and weft yarns.

36 Claims, 1 Drawing Sheet

U.S. PATENT DOCUMENTS

| | | | |
|---|---|---|---|
| 4,359,556 | 11/1982 | Lakshmanan et al. | 525/420.5 |
| 4,371,576 | 2/1983 | Machell | 428/92 |
| 4,405,668 | 9/1983 | Wald | 428/40 |
| 4,437,918 | 3/1984 | Morohaeshi et al. | 156/322 |
| 4,556,602 | 12/1985 | Williams | 428/259 |
| 4,557,774 | 12/1985 | Hoopengardner | 156/71 |
| 4,617,210 | 10/1986 | Zybko | 428/35 |
| 4,647,484 | 3/1987 | Higgins | 428/40 |
| 4,680,209 | 7/1987 | Zybko et al. | 428/35 |
| 4,695,493 | 9/1987 | Friedlander et al. | 428/40 |
| 4,702,948 | 10/1987 | Sieber-Gadient | 428/40 |
| 4,797,170 | 1/1989 | Hoopengardner | 156/71 |
| 4,808,459 | 2/1989 | Smith et al. | 428/95 |
| 4,824,498 | 4/1989 | Goodwin et al. | 156/71 |
| 4,844,765 | 7/1989 | Reith | 156/306.6 |
| 4,849,267 | 7/1989 | Ward et al. | 428/41 |
| 4,853,280 | 8/1989 | Poteet | 442/221 X |
| 4,870,110 | 9/1989 | Mehra et al. | 521/46.5 |
| 4,877,827 | 10/1989 | Van Der Groep | 524/477 |
| 4,968,463 | 11/1990 | Levasseur | 264/40.1 |
| 4,988,551 | 1/1991 | Zegler | 428/40 |
| 4,988,764 | 1/1991 | Nishio et al. | 525/66 |
| 5,010,138 | 4/1991 | Westeppe et al. | 525/183 |
| 5,030,497 | 7/1991 | Claessen | 428/95 |
| 5,112,908 | 5/1992 | Epstein | 525/66 |
| 5,122,404 | 6/1992 | Fowler | 428/87 |
| 5,122,569 | 6/1992 | Scheibelhoffer et al. | 525/66 |
| 5,198,277 | 3/1993 | Hamilton et al. | 428/92 |
| 5,217,655 | 6/1993 | Schmidt | 264/22 |
| 5,294,384 | 3/1994 | David et al. | 264/37 |

WOVEN FLOOR COVERINGS

This application is a continuation-in-part of Application Ser. No. 08/388,986 filed Feb. 15, 1995.

FIELD OF THE INVENTION

The present invention relates generally to woven floor coverings, and relates more particularly to a woven floor covering with a backing.

BACKGROUND OF THE INVENTION

Commercial buildings require a large area of floor covering. Such large installations are typically done using tufted carpet having a primary backing and secondary backing. Tufted carpet is manufactured by needling through the primary backing or base fabric to form pile loops. The base fabrics are woven, nonwoven, or a combination thereof. The backing and pile loops are locked together using a binder (e.g., a plastisol). Another option for large installations is a nonwoven carpet having a backing. Both tufted nonwoven carpets are satisfactory for many uses; however, many consumers regard such carpets as aesthetically inferior, particularly as compared to woven carpet.

Historically, woven carpet has been more difficult and expensive to produce as compared to tufted and non-woven carpet. This is particularly true with respect to manufacturing large quantities of carpet such as the quantity needed for large commercial buildings. There has, however, been an increase in demand and capacity for large quantities of woven carpet due, in part, to the advent of new developments in raw materials (e.g., polypropylene yarns being more wool like), and of technical improvements in weaving equipment. Interior styling, particularly for large area commercial installations, has become easier and more fashionable. Thus, there is an increased need for woven carpet, and particularly backed woven carpet. Woven carpet can be backed with various backing such as vinyl or urethane foams. There has, however, been a problem with delamination. Further, it is desirable to provide a backed woven carpet which can be mass produced.

SUMMARY OF THE INVENTION

The present invention provides a woven textile surface covering having a first layer with a decorative face surface and a back surface where the first layer is formed from interwoven warp and weft yarns that define interstices therebetween. The woven textile surface covering has a second layer formed from a resin composition where the second layer has a yarn engaging surface and opposing back surface. At least a portion of the yarn engaging surface occupies the interstices between the interwoven warp and weft yarns. The resin composition further includes a cross-linking agent that is effective for cross-linking the resin composition with the warp and weft yarns.

Further the present invention is provided with a method for preparing a woven textile surface covering. The method comprises applying a resin composition layer to a woven layer where the woven layer is formed from interwoven warp and weft yarns that define interstices therebetween. The resin composition layer has a yarn engaging surface and an opposing back surface where at least a portion of the yarn engaging surface occupies the interstices. The resin composition layer includes a resin composition and a cross-linking agent that is effective for cross-linking the resin composition with the warp and weft yarns. The method also comprises penetrating at least a portion of the warp and weft yarns with the resin composition and the cross-linking agent as well as heating the resin composition layer after it has been applied to the woven layer thereby cross-linking the woven layer with the resin composition layer.

It is an object of this invention that the resin composition and the cross-linking agent are effective for penetrating at least a portion of the warp and weft yarns.

It is a further object of this invention to provide a woven textile surface covering with a resin composition that is derived from at least one monomer selected from the group of acrylic compounds, vinyl compounds, chlorinated vinyl compounds, styrene, butadiene, ethylene, butene, and blends thereof. Further, the resin composition may be derived from a vinyl compound selected from the group consisting of polyvinyl chloride, polyvinylidine chloride, polyethylene chloride, polyvinyl acetate, polyvinyl acetal and mixtures thereof. Additionally, the woven textile surface covering may have a resin composition that is derived from the vinyl chloride monomer wherein the resin composition also has a monosubstituted alkyl phthalate where the alkyl group ranges from about a $C_5$ alkyl group to about a $C_{12}$ alkyl group and where the monosubstituted alkyl phthalate is in an amount between about 15% and about 60% by weight of the vinyl chloride monomer. Further, the resin composition may be derived from a vinyl chloride monomer where the resin composition further contains a di-substituted alkyl phthalate where each alkyl group ranges from about a $C_5$ alkyl group to about a $C_{12}$ alkyl group where the di-substituted alkyl phthalate is in an amount between about 15% and about 60% by weight of the vinyl chloride monomer.

It is the further object of this invention to provide a resin composition that is effective for chemically bonding to at least a portion of the warp and weft yarns. The textile surface covering may be provided with warp and weft yarns that are made of nylon having available amine groups and where the resin composition has carboxylic acid groups for reacting with the amine groups to form a chemical bond between the nylon and the resin composition.

Additionally, the woven textile surface covering may be provided with a cross-linking agent that is a melamine compound.

It is a further object of the invention to provide the woven textile surface covering with warp and weft yarns that are made of polyester having available hydroxyl groups. An aromatic isocyanurate cross-linking agent having available isocyanate groups for reacting with said hydroxyl groups is used to form a chemical bond between the polyester warp and weft yarns and the cross-linking agent. Further the cross-linking agent has an affinity for binding to the resin composition.

Further, the woven textile surface covering may be provided with a backing layer. The backing layer may be a foamed polymer or copolymer. Additionally, the backing layer may be selected from the group consisting of bitumen, urethane, ethylene, propylene, isobutylene, vinyl chloride, recycled waste polymeric waste materials, and blends thereof.

An object of this invention also includes providing a releasable adhesive layer bonded to the backing layer. The releasable adhesive layer may be an oleophobic pressure adhesive.

An object of this invention is to heat the back surface to provide adhesion properties to bond the backing layer to the resin composition.

DETAILED DESCRIPTION OF THE INVENTION

The present invention now will be described more fully with reference to the accompanying drawings, in which preferred embodiments of the invention are shown. This invention can be embodied in many different forms and should not be construed as limited to the embodiments set forth herein.

Figure 1:
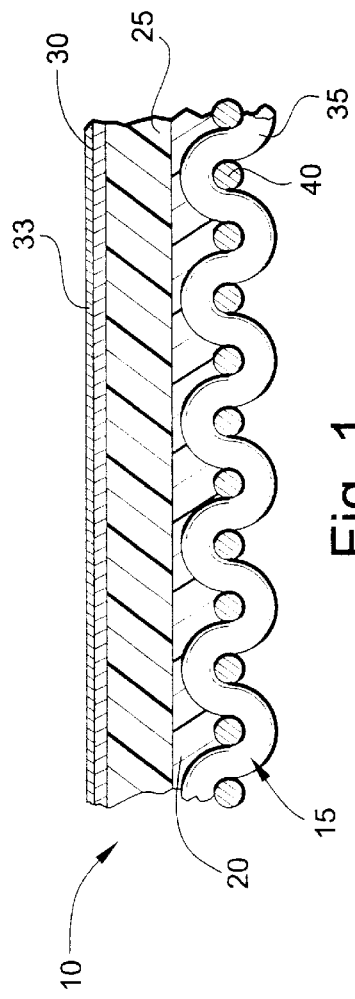
FIG. 1 is a cross-sectional view of a woven floor covering in accordance with the present invention.
Figure 2:
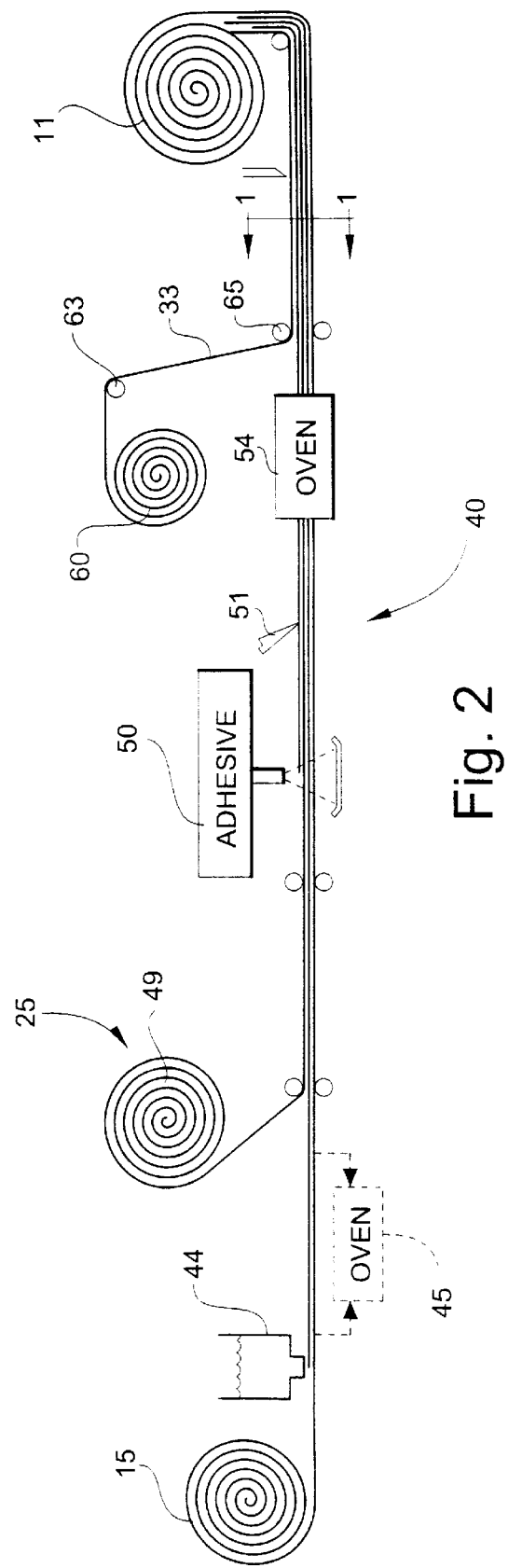
FIG. 2 is a diagrammatic and schematic depiction of a method of making the backed woven floor covering of FIG. 1 in accordance with the present invention.

Referring now to the drawings, and more particularly to FIG. 1, a reference number 10 designates the textile surface covering, e.g., a floor covering, of the present invention subsequent to its manufacturing and is shown convoluted into a roll form 11 (e.g., a six foot wide roll) in FIG. 2. It will be understood by those skilled in the art that the invention can take many other forms, including, but not limited to, a carpet tile, a carpeted mat, and the like.

As illustrated in FIG. 1, the woven floor covering 10, comprises a woven carpet layer 15, a resin composition layer 20, a backing layer 25, and optionally a releasable adhesive layer 30 with a release cover 33. The woven carpet layer 15 is formed by weaving warp yarns 35 and weft yarns 40 to provide a decorative face surface and a back surface. Suitable yarn materials include wool, cotton, nylon, acrylic, modacrylic, polyester or other synthetic or natural yarns, the selection of which is within the skill of one in the art.

The resin composition layer 20 penetrates between interstices of the warp yarns 35 and weft yarns 40. The resin composition layer can be in plastisol, hot melt or latex form. Preferably, the resin composition layer is effective for wetting, penetrating, and encapsulating at least a portion of the warp and weft yarns of the woven layer. The addition of a chemical penetrate can be added to the resin composition layer to ensure that the resin composition layer properly wets, penetrates and encapsulates the woven yarns. This penetration and encapsulation of the yarns will ensure bonding of the backing to the yarns, reduce and prevent yarn pull out during normal use, reduce the wear of the face of the product during normal use, reduce or eliminate yarn fuzzing and pilling during normal use, and will enhance the coating process of the material.

Preferably, the resin composition layer includes a cross-linking agent that will further increase the ability of the resin composition layer to hold the warp and weft yarns thereby reducing the possibility of delamination. The cross-linking agent can increase the ability of the resin composition layer to hold the warp and weft yarns through either direct chemical bonding or through indirect secondary chemical bonding interactions. Further, the cross-linking agent coupled with a resin composition layer capable of wetting, penetrating, and encapsulating at least a portion of the warp and weft yarns will increase the wear of the carpet, improve the seam integrity of the carpet, and reduce edge ravel. Additionally, the resin composition can act as both the resin composition and the cross-linking agent where the resin composition is capable of reacting with and forming a chemical bond with the warp and weft yarns.

The resin composition layer is a suitable thermoplastic material and includes polymers derived from at least one monomer selected from the group consisting of acrylic compounds, vinyl compound, chlorinated vinyl compounds, styrene, butadiene, ethylene, butene, and copolymers or blends thereof. A preferred resin composition layer is a polymer or copolymer of a vinyl compound, e.g., polyvinyl chloride, polyvinylidine chloride, polyethylene chloride, polyvinyl acetate, polyvinyl acetal, etc., and copolymers and mixtures thereof. A preferred specific example of a resin composition layer is a vinyl chloride, resin-based compound, such as an alkyl phthalate substituted one or two times with a linear or branched $C_5$–$C_{12}$ alkyl group, which is included in an amount by weight equal to between about 15 to about 60 percent of the weight of the vinyl chloride resin component. Particularly preferred vinyl chlorides include but should not be limited to Vinycel 124 or 125, commercially available from Policyd SA DE CV, Mexico; GEON® 137, commercially available from The Geon Company, Cleveland, Ohio; and OXY® 67SF, commercially available from Occidental Chemical Corp., Dallas, Tex. Particularly preferred alkyl phthalate plasticizers include but should not be limited to SANTICIZER® 160, commercially available from Monsanto Company, Saint Louis, Mo.; PALATINOL® 711, commercially available from BASF Corporation, Parsippany, N.J.; and JAYFLEX®, DINP commercially available from Exxon Chemical America, Houston, Tex. The resin composition layer can be applied as a unitary layer, or one or more additional layers of the same or different resin composition layers can be applied. For example, a less filled composition can be applied, followed by application of a more highly filled resin composition layer.

A preferred resin composition layer is one that is effective in chemically bonding to the warp and weft yarns. Preferably, the resin composition layer contains a resin composition that contains acrylic groups on the polymer or copolymer resin and most preferably, the polymer or copolymer has acrylic acid groups. One such resin is GEON® 137, commercially available from The Geon Company, Cleveland, Ohio.

The resin composition layer also includes a cross-linking agent. The cross-linking agent increases the adhesion properties between the resin layer and the warp and weft yarns of the woven layer. Preferably, the cross-linking agent chemically bonds to at least a portion of the woven layer and binds to the resin composition either by a direct chemical bond or through secondary chemical bonding interactions. A preferred cross-linking agent for the acrylic acid resin and capable of penetrating the warp and weft yarns is a melamine cross-linking agent. One such cross-linking agent is CYMEL® 303, commercially available from Cytec Industries, West Patterson, N.J. Other possible cross-linking agents include but are not limited to CYMEL® 380 and CYMEL® 325 commercially available from American Cyanamid Co., Wayne, N.J.

It is believed that the cross-linking reaction mechanism includes the reaction of the acrylic group on the GEON® 137 with methoxy groups on CYMEL® 303.

Further, when the yarns are made of nylon, possible reaction also occurs with amine groups on the nylon and the acid groups on the GEON® 137. In this embodiment, the GEON® 137 resin can act as both the resin composition and the cross-linking agent. These reactions would be similar to nylon polymerization such as, diamines reacting with dicarboxylic acids. If desired, an additional cross-linking agent can be added to the GEON® 137 resin.

Further, when the warp and weft yarns are made of polyester, a preferred cross-linking agent is an aromatic isocyanurate having available isocyanate groups. It is believed that the isocyanate groups react with available hydroxyl groups on the polyester yarns to form a chemical bond. Additionally, the cross-linking agent has an affinity for binding to the resin composition either through a chemical bond or through secondary chemical bonding. One such cross-linking agent is, but should not be limited to BA 2001 commercially available from Bayer Corporation, Akron, Ohio.

Preferably, the backing layer 25 is formed of a foam polymer or copolymer. Suitable foam compositions include polymers derived from at least one monomer selected from the group consisting of bitumen, urethane, ethylene, propylene, isobutylene, vinyl chloride, and copolymers or blends thereof. Alternatively, the backing layer 25 may be formed from recycled waste polymeric materials such as those described in, and related to, U.S. Pat. No. 5,728,741, entitled PROCESS OF RECYCLING WASTE POLYMERIC MATERIAL AND AN ARTICLE UTILIZING THE SAME, issued in the names of Stephen A. Zegler and Paul L. Weinle, herein incorporated by reference.

The backing layer 25 can be neat or blended resin or can be filled with organic or inorganic fillers. Examples of inorganic fillers can be in fibrous, flake, crystalline, amorphous, hollow, powder, or particulate form. Examples of fillers include calcium carbonate, calcium sulfate particles, magnesium oxide, magnesium hydroxide, perlite, synthetic mica, vermiculite, clays, thermally stable carbon fibers, zinc oxide, dawsonite, low density hollow spheres of calcium carbonate, glass spheres, glass bubbles, thermally stable carbon microspheres, alumina, recycled fly ash, low density processed calcium carbonate such as Duvall 85, commercially available form Franklin Limestone Company, Nashville, Tenn. Additionally, the backing layer 25 may utilize a fiberglass scrim.

The type of releasable adhesive applied also can vary. If a plastisol backing layer 25 such as those which contain polymers or copolymers of vinyl compounds is desired, an oleophobic pressure sensitive adhesive is desirable. The term oleophobic as used herein means a pressure sensitive adhesive which is not adversely affected by the plasticizer migration inherent in the vinyl plastisol secondary backing and which also has high shear strength for preventing slippage between the floor covering and an underlying floor and which has low tensile strength to facilitate removal and replacement of the floor covering 10 by permitting peeling of the floor covering from the floor.

Preferably, the oleophobic pressure sensitive adhesive used with the aforementioned backing layer 25 comprises a polymer or copolymer of at least one ethylenically unsaturated monomer. Particularly suitable are pressure sensitive adhesives derived from acrylic monomers. Examples of acrylic monomers include alkyl esters of acrylic acid with an alkyl group having from 1 to 18 carbon atoms, including methyl, ethyl, n-butyl, sec-butyl, the various isomeric pentyl, hexyl, heptyl, and octyl (especially 2-ethylhexyl), lauryl, cetyl, steryl, and like groups; and alkyl esters of methacrylic acid with an alkyl group having from 4 to 18 carbon atoms, including n-butyl, n-hexyl, 2-ethyl-hexyl, n-octyl, lauryl, cetyl, steryl, and like groups. These monomers are selected to provide the high shear strength and low tensile strength needed to one skilled in the art. One particularly suitable oleophobic pressure sensitive adhesive which from testing is deemed to be commercially acceptable is an 80/20 copolymer of butyl acrylate/2-ethyl hexyl acrylate. Blends or terpolymers of acrylates and vinyl acetates also produce acceptable oleophobic pressure sensitive adhesive for this application.

A release cover 33 is releasably secured to the layer of pressure sensitive adhesive 30 so as to protect and maintain the tackiness of the pressure sensitive adhesive layer 30. To minimize wrinkling of the release cover 33 during winding onto a roll 11, the release cover 33 preferably is formed of a flexible plastic material such as a linear low density polyethylene having inherent stretchability.

Referring now to FIG. 2, a basic carpet production line system is generally indicated by the reference numeral 40. The woven carpet layer 15 is conveyed from a carpet source such as a roll to a plastisol resin application station 44 wherein the resin 20 is applied and fused between interstices of the warp yarns 35 and weft yarns 40. The carpet is then advanced to an oven 45 or other means for providing heat to the surface of the used plastisol resin composition layer such as a radiant heat source. Typically the heat applied is between about 135° C. and about 175° C. A backing layer 25 is advanced from a suitable supply source, such as a roll 49 so as to contact one surface of the backing layer 25 to the surface of the fused plastisol resin composition layer.

Optionally, a pressure sensitive releasable adhesive layer 30 can be applied at a releasable adhesive application station 50 and amount regulated using a doctor blade 51. The adhesive is cured using an oven 54. After curing, a release cover 33 is releasably secured to the layer of the pressure sensitive adhesive so as to maintain the tackiness thereof. The release cover 33 is fed from a continuous roll 60 along a guide roll 63 and an engagement roll 65 onto the floor covering. The backed woven floor covering is then wound onto a roll.

The following is an example to illustrate the present invention and should not be construed as limiting the present invention.

EXAMPLE 1

A woven carpet is prepared on a commercially available weaving apparatus. A resin composition layer comprising an acrylic acid copolymer and a melamine cross-linking agent are then applied to the back surface of the woven carpet at a rate of 6 (six) to 20 (twenty) oz./sq.yd. The resin composition layer has the following components. The example below is in PHR (parts per hundred resin).

| Resin Composition Layer | | |
| --- | --- | --- |
| Material Trade Name | Material Type | PHR |
| GEON ® 137 | Copolymer | 70 |
| GEON ® 180 | Homopolymer | 30 |
| Exxon L9P | Plasticizer | 72 |
| CPC BZ 205-D | Stabilizer | 1 |
| CYMEL ® 303 | Cross-Linker | 5 |

The resin composition layer is heated in an oven at a temperature of 325° F. to 350° F. A backing layer may then be applied to the resin composition layer and heated to 325° F. to 400° F.

EXAMPLE 2

A woven carpet is prepared on a commercially available weaving apparatus. A resin composition layer comprising an PVC homopolymer and an aromatic isocyanurate cross-linking agent are then applied to the back surface of the woven carpet at a rate of 6 (six) to 20 (twenty) oz./sq.yd. The resin composition layer has the following components. The example below is in PHR (parts per hundred resin).

| Resin Composition Layer | | |
|---|---|---|
| Material Trade Name | Material Type | PHR |
| OXY ® 6337 | PVC homopolymer | 100 |
| Exxon L9P | Plasticizer | 72 |
| CPC BZ 205-D | Stabilizer | 1 |
| BA 2001 | Cross-Linker | 5 |

The resin composition layer is heated in an oven at a temperature of 325° F. to 350° F. A backing layer may then be applied to the resin composition layer and heated to 325° F. to 400° F.

The foregoing is illustrative of the present invention and is not to be construed as limiting thereof. It will therefore be readily understood by those persons skilled in the art that the present invention is susceptible of a broad utility and application. Many embodiments and adaptations of the present invention other than those herein described, as well as may variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A woven textile surface covering comprising:
    a first layer having a decorative face surface and a back surface wherein said first layer is formed from interwoven warp and weft yarns defining interstices therebetween; and
    a second layer formed from a resin composition, said second layer having a yarn engaging surface and an opposing back surface wherein at least a portion of said yarn engaging surface occupies said interstices, wherein said resin composition further includes a cross-linking agent effective for cross-linking said resin composition with said warp and weft yarns.

2. The woven textile surface covering according to claim 1 wherein said resin composition and said cross-linking agent are effective for penetrating at least a portion of said warp and weft yarns.

3. The woven textile surface covering according to claim 1 wherein said resin composition is derived from at least one monomer selected from the group consisting of acrylic compounds, vinyl compounds, chlorinated vinyl compounds, styrene, butadiene, ethylene, butene, and blends thereof.

4. The woven textile surface covering according to claim 1 wherein said resin composition is derived from a vinyl compound selected from the group consisting of polyvinyl chloride, polyvinylidine chloride, polyethylene chloride, polyvinyl acetate, polyvinyl acetal, and mixtures thereof.

5. The woven textile surface covering according to claim 1 wherein said resin composition is derived from a vinyl chloride monomer and wherein said resin composition further comprises a mono-substituted alkyl phthalate wherein the alkyl group ranges from about a $C_5$ alkyl group to about a $C_{12}$ alkyl group and wherein said mono-substituted alkyl phthalate is in an amount between about 15 and about 60 percent by weight of said vinyl chloride monomer.

6. The woven textile surface covering according to claim 1 wherein said resin composition is derived from a vinyl chloride monomer and wherein said resin composition further comprises a di-substituted alkyl phthalate wherein each alkyl group ranges from about a $C_5$ alkyl group to about a $C_2$ alkyl group and wherein said di-substituted alkyl phthalate is in an amount between about 15 and about 60 percent by weight of said vinyl chloride monomer.

7. The woven textile surface covering according to claim 1 wherein said resin composition is effective for chemically bonding to at least a portion of said warp and weft yarns.

8. The woven textile surface covering according to claim 7 wherein said warp and weft yarns are made of nylon having available amine groups and wherein said resin composition acts as the cross-linking agent, and wherein said resin composition has carboxylic acid groups for reacting with said amine groups thereby forming a chemical bond between said nylon and said resin composition.

9. The woven textile surface covering according to claim 1 wherein said warp and weft yarns are made of polyester having available hydroxyl groups, wherein said cross-linking agent is an aromatic isocyanurate having available isocyanate groups for reacting with said hydroxyl groups thereby forming a chemical bond between said warp and weft yarns and said cross-linking agent, and wherein at least a portion of said cross-linking agent reacts with at least a portion of said resin composition, thereby binding said cross-linking agent to said resin composition.

10. The woven textile surface covering according to claim 3 wherein said cross-linking agent comprises a melamine compound.

11. The woven textile surface covering according to claim 1 and further comprising a backing layer bonded to said back surface of said second layer.

12. The woven textile surface covering according to claim 11 wherein said backing layer is a foamed polymer or copolymer.

13. The woven textile surface covering according to claim 11 wherein said backing layer is selected from the group consisting of bitumen, urethane, ethylene, propylene, isobutylene, vinyl chloride, recycled waste polymeric materials, and blends thereof.

14. The woven textile surface covering according to claim 11 further comprising a releasable adhesive layer bonded to said backing layer opposite said second layer.

15. The woven textile surface covering according to claim 14 wherein said releasable adhesive layer is an oleophobic pressure sensitive adhesive.

16. The woven textile surface covering according to claim 14 further comprising a release cover on said releasable adhesive layer.

17. The woven textile surface covering according to claim 14 wherein said back surface is heated to provide the adhesion properties to bond said second layer to said backing layer.

18. A method of preparing a woven textile surface covering, the method comprising:
    applying a resin composition layer to a woven layer wherein said woven layer is formed from interwoven warp and weft yarns defining interstices therebetween, said resin composition layer having a yarn engaging surface and an opposing back surface wherein at least a portion of said yarn engaging surface occupies said interstices, wherein said resin composition layer includes a resin composition and a cross-linking agent effective for cross-linking said resin composition with said warp and weft yarns;

penetrating at least a portion of said warp and weft yarns with said resin composition and said cross-linking agent; and heating said resin composition layer after application to said woven layer thereby cross-linking said woven layer with said resin composition layer.

19. The method according to claim 18 wherein said resin composition and said cross-linking agent are effective for penetrating at least a portion of said warp and weft yarns.

20. The method according to claim 18 wherein said resin composition is derived from at least one monomer selected from the group consisting of acrylic compounds, vinyl compounds, chlorinated vinyl compounds, styrene, butadiene, ethylene, butene, and blends thereof.

21. The method according to claim 18 wherein said resin composition is derived from a vinyl compound selected from the group consisting of polyvinyl chloride, polyvinylidine chloride, polyethylene chloride, polyvinyl acetate, polyvinyl acetal, and mixtures thereof.

22. The method according to claim 18 wherein said resin composition is derived from a vinyl chloride monomer and wherein said resin composition further comprises a mono-substituted alkyl phthalate wherein the alkyl group ranges from about a $C_5$ alkyl group to about a $C_{12}$ alkyl group and wherein said mono-substituted alkyl phthalate is in an amount between about 15 and about 60 percent by weight of said vinyl chloride monomer.

23. The method according to claim 18 wherein said resin composition is derived from a vinyl chloride monomer and wherein said resin composition further comprises a di-substituted alkyl phthalate wherein each alkyl group ranges from about a $C_5$ alkyl group to about a $C_{12}$ alkyl group and wherein said di-substituted alkyl phthalate is in an amount between about 15 and about 60 percent by weight of said vinyl chloride monomer.

24. The method according to claim 18 wherein said resin composition is effective for chemically bonding to at least a portion of said warp and weft yarns.

25. The method according to claim 24 wherein said warp and weft yarns are made of nylon having available amine groups wherein said resin composition acts as the cross-linking agent, and wherein said resin composition has carboxylic acid groups for reacting with said amine groups thereby forming a chemical bond between said nylon and said resin composition.

26. The method according to claim 18 wherein said warp and weft yarns are made of polyester having available hydroxyl groups, wherein said cross-linking agent is an aromatic isocyanurate having available isocyanate groups for reacting with said hydroxyl groups thereby forming a chemical bond between said warp and weft yarns and said cross-linking agent, and wherein said cross-linking agent reacts with said resin composition, thereby binding said cross-linking agent to said resin composition.

27. The method according to claim 20 wherein said cross-linking agent comprises a melamine compound.

28. The method according to claim 18 further comprising contacting a backing layer to said back surface of said resin composition layer and bonding said backing layer to said resin composition layer.

29. The method according to claim 28 wherein said backing layer is a foamed polymer or copolymer.

30. The method according to claim 28 wherein said backing layer is selected from the group consisting of bitumen, urethane, ethylene, propylene, isobutylene, vinyl chloride, recycled waste polymeric materials, and blends thereof.

31. The method according to claim 18 wherein penetrating at least a portion of said warp and weft yarns includes heating said resin composition layer to a temperature of from about 135° C. to about 175° C.

32. The method according to claim 31 wherein heating said resin composition layer comprises applying radiant heat to said resin composition layer.

33. The method according to claim 28 wherein a layer of a releasable adhesive layer is applied to said backing layer opposite said resin composition layer.

34. The method according to claim 33 wherein a release cover is applied to said releasable adhesive layer.

35. The method according to claim 34 wherein said releasable adhesive layer is an oleophobic pressure sensitive adhesive.

36. The method according to claim 28 wherein said bonding of said backing layer to said resin composition layer uses heat from the heated resin composition layer.

* * * * *